US006620758B1

(12) United States Patent
Lindroos et al.

(10) Patent No.: US 6,620,758 B1
(45) Date of Patent: Sep. 16, 2003

(54) OLEFIN POLYMERIZATION CATALYST COMPONENT, ITS PREPARATION AND USE

(75) Inventors: Jarmo Lindroos, Tolkkinen (FI); Solveig Johansson, Stenungsund (SE); Päivi Waldvogel, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/286,437

(22) Filed: Apr. 6, 1999

(30) Foreign Application Priority Data

Apr. 6, 1998 (FI) .................................................. 980788

(51) Int. Cl.$^7$ .......................... B01J 31/00; B01J 37/00; C08F 4/02; C08F 4/60; C08F 4/44
(52) U.S. Cl. ...................... 502/110; 502/111; 502/115; 502/128; 502/132; 502/133; 502/134; 502/153; 502/154; 502/171; 526/124.3; 526/125.2; 526/132
(58) Field of Search ................. 502/103, 104, 502/110, 115, 111, 128, 132, 133, 134, 153, 154, 171; 526/124.3, 125.2, 132

(56) References Cited

U.S. PATENT DOCUMENTS

| | | | | |
|---|---|---|---|---|
| 4,766,100 A | * | 8/1988 | Best et al. | 502/115 |
| 4,900,706 A | * | 2/1990 | Sasaki et al. | 502/116 |
| 5,192,731 A | * | 3/1993 | Kioka et al. | 502/110 |
| 5,330,951 A | * | 7/1994 | Mink et al. | 502/115 |

FOREIGN PATENT DOCUMENTS

| | | |
|---|---|---|
| EP | 0032307 A2 | 7/1981 |
| EP | 0688794 | 12/1995 |
| FI | 89500 | 6/1993 |
| FI | 92405 | 7/1994 |
| WO | WO9605236 | 2/1996 |

\* cited by examiner

Primary Examiner—Mark L. Bell
Assistant Examiner—J. Pasterczyk

(74) *Attorney, Agent, or Firm*—Birch, Stewart, Kolasch & Birch, LLP

(57) ABSTRACT

A catalyst having high activity independent of the hydrogen concentration and low gel productivity in the polymerization of ethylene has been prepared. The preparation comprises the steps of reacting:

a support comprising a magnesium halide compound having the formula (1):

$$(RO)_{2-n}Mg X_n \quad (1)$$

wherein R is a $C_1$–$C_{20}$ alkyl or a $C_7$–$C_{26}$ aralkyl, each the same or different, X is a halogen, and n is an integer 1 or 2;

a compound having the formula (2):

$$R^1{}_n{}^1 M_m{}^1 X^1{}_{(3m^1-n^1)} \quad (2)$$

wherein M is B or Al, each same or different $R^1$ is a $C_1$–$C_{10}$ alkyl, each same or different $X^1$ is a halogen, $m^1$ is 1 or 2, $n^1$ is 1 or 2 when $m^1$ is 1 and $n^1$ is an integer from 1 to 5 when $m^1$ is 2;

a magnesium composition containing magnesium bonded to a hydrocarbyl and magnesium bonded to a hydrocarbyl oxide, said magnesium composition having the empirical formula (3):

$$R^2{}_n{}^2(R^3 O)_{2-n^2} Mg \quad (3)$$

wherein each same or different $R^2$ is a $C_1$–$C_{20}$ alkyl each same or different $R^3$ is a $C_1$–$C_{20}$ alkyl, $n^2$ is between 0.01 and 1.99, which is the contact product of a dialkyl magnesium and an alcohol in a molar ratio of alcohol to dialkyl magnesium of 1.8–1.98 mol/mol, and;

a titanium halide compound having the formula (4):

$$(R^4 O)_n{}^3 TiX^2{}_{4-n^3} \quad (4)$$

wherein each same or different $R^4$ is a $C_1$–$C_{20}$ alkyl, each same or different $X^2$ is a halogen, and $n^3$ is 0 or an integer 1–3.

33 Claims, No Drawings

OLEFIN POLYMERIZATION CATALYST COMPONENT, ITS PREPARATION AND USE

The invention relates to a process for the preparation of a high activity catalyst component for the production of olefin polymers. The invention also relates to a procatalyst prepared by said process and the use of such a procatalyst in the polymerization of olefins.

BACKGROUND OF THE INVENTION

Olefinic unsaturated monomers such as ethylene can often be polymerized in the presence of a catalyst composition, which has essentially two components: a compound of a transition metal belonging to one of groups 4 to 6 of the Periodic Table of Elements (Hubbard, IUPAC 1990) which is often called a procatalyst, and a compound of a metal belonging to any of groups 1 to 3 of said Table which is often called a cocatalyst. This kind of Ziegler-Natta catalyst composition has been further developed by depositing the procatalyst on a more or less inert and particulate support and by adding to the catalyst composition in the stages of its preparation several additives, among others electron donating compounds. These compounds have improved the polymerization activity of the catalyst, the operating life and other properties of the catalyst composition and first of all properties of the polymers which are obtained by means of the catalyst composition.

When ethylene polymers are produced, the polymer molecules formed are not similar by molecular weight, but a mixture having a narrow or broad molecular weight distribution is developed. The broadness of the molecular weight distribution may be described by utilization of the ratio of two different averages, namely the weight average molecular $M_w$, and the number average molecular weight $M_n$, where a high value of $M_w/M_n$ indicates a broad molecular distribution. For controlling the molecular weight a so called chain transfer agent can be added to the polymerization reaction mixture. In order to obtain polymer products having different molecular weights, different amounts of the chain transfer agent for controlling the molecular weight must be fed into the polymerization reaction mixture. The most usual and preferable chain transfer agent is hydrogen, because when using it no foreign atoms or atom groups are left in the growing molecule, that would cause inconveniencies for the polymerization process or disadvantageous properties of the polymer produced.

How well the molecular weight of the produced polymer varies as function of the hydrogen amount, i.e. how much the so called hydrogen sensibility changes, greatly depends on the catalyst composition. Generally the problem is, that in polyethylene production the polymerization activity decreases to quite an extent the more hydrogen is present.

This absence of catalyst activity balance is a common drawback for all prior art catalysts today. The imbalance shows up when, using prior art catalysts, a drastic drop in the productivity of the catalysts occurs when going from polymerization conditions giving high molecular weight polymers (low melt flow rate) to polymerization conditions giving low molecular weight polymers (high melt flow rate). Even if such a commercial catalyst can have a quite good productivity at a polymer melt flow rate (MFR, defined according to standard ISO 1133) of 1, there is often only 10% left of the productivity when producing a MFR of 500. Thus it is desirable to provide a catalyst system having a high activity which is independent of the molar mass of the polymer under formation.

The activity balance discussed above is important in production of bimodal polyethylene. There, a low molecular weight component is produced in one stage at a high hydrogen concentration and a high molecular weight component is produced in another stage at a low hydrogen concentration. Since no fresh catalyst is added between these polymerization stages, the catalyst employed in production of bimodal polyethylene must be able to produce the different molecular weights with a high productivity.

EP-A-32307 discloses a procatalyst that has been prepared by treating an inorganic support like silica with a chlorination agent like ethyl aluminium dichloride which support is then contacted with a magnesium alkyl compound like butyl ethyl magnesium, and with titanium tetrachloride (see claim 1, example 1, table 1).

WO-A-96/05236 discloses a catalyst component comprising (i) a particulate support where the majority of particles is in the form of an agglomerate of subparticles and (ii) a magnesium halide. The publication discusses the preparation of the support material. It also describes catalyst preparation and polymerization examples. The catalyst is prepared by adding titanium tetrachloride and DEAC on the agglomerated carrier containing magnesium chloride. The polymerization examples show that a higher bulk density and a higher MFR (better hydrogen response) as well as a lower FRR (narrower molecular weight distribution) is obtaines by the catalyst prepared according to the disclosure. The publication does no refer to the homogeneity of the material.

EP-A-688 794 discloses a process for the preparation of a high activity procatalyst, wherein an inorganic support is reacted with an alkyl metal chloride, the first reaction product is reacted with a compound containing hydrocarbyl and hydrocarbyl oxide linked to magnesium, and the obtained second reaction product is contacted with a titanium chloride compound. The obtained procatalyst has good activity both at high and low MFR polymerization conditions, but it has the drawback of giving an inhomogeneous ethylene polymer product, resulting in gels and white spots in the polymer material. These inhomogenities have detrimental effect on the appearance and mechanical properties of polyethylene film.

DESCRIPTION OF THE INVENTION

The drawbacks encountered by EP-A-688 794 and other prior art catalysts have now been eliminated by a modified process, characterized by the steps of reacting a support, at least the surface of which comprises a magnesium halide compound having the formula (1):

$$(RO)_{2-n}MgX_n \tag{1}$$

wherein R is a $C_1$–$C_{20}$ alkyl or a $C_7$–$C_{26}$ aralkyl, each same or different X is a halogen, and n is an integer 1 or 2, an alkyl metal halide compound having the formula (2):

$$R^1{}_n{}^1 M_m{}^1 X^1{}_{(3m^1-n^1)} \tag{2}$$

wherein M is B or Al, each same or different $R^1$ is a $C_1$–$C_{10}$ alkyl, each same or different $X^1$ is a halogen, $n^1$ is 1 or 2 when $m^1$ is 1 and $n^1$ is an integer from 1 to 5 when $m^1$ is 2, a magnesium composition containing magnesium bonded to a hydrocarbyl and magnesium bonded to a hydrocarbyl oxide, said magnesium composition having the empirical formula (3):

$$R^2_{n^2}(R^3O)_{2-n^2}Mg \qquad (3)$$

wherein each same or different $R^2$ is a $C_1$–$C_{20}$ alkyl, each same or different $R^3$ is a $C_1$–$C_{20}$ alkyl or a $C_1$–$C_{20}$ alkyl containing a hetero element, and $n^2$ is between 0.01 and 1.99, and a titanium halide compound having the formula (4):

$$(R^4O)_{n^3}TiX^2_{4-n^3} \qquad (4)$$

wherein each same or different $R^4$ is a $C_1$–$C_{20}$ alkyl, each same or different $X^2$ is a halogen, $n^3$ is 0 or an integer 1–3, and Ti is quadrivalent titanium.

By the formula (1) is meant that the inorganic support may be coated by $MgCl_2$ or RoMgCl. Thus n is 1 or 2.

By "magnesium composition" above is meant a mixture or a compound. Note that formula (3) is an empirical formula and expresses the molar amounts of alkyl $R^2$ and alkoxy $OR^3$ relative to the amount of magnesium Mg, which has been defined as 1, and differs from formulas (1), (2) and (4), which disclose the molecular composition of distinct compounds only.

A procatalyst has now been discovered by which ethylene homopolymers or copolymers having low or high molecular weights can be produced with an even and high activity as well as a homogeneous consistance. Independently of the amount of hydrogen introduced into the polymerization reactor, the activity of the catalyst remains more or less unchanged and a homogeneous ethylene polymer product is obtained.

The unique feature of the catalyst according to the invention now lies over its good balance in activity and a homogeneous product in a very wide range of molar mass regulating hydrogen partial pressures used in the polymerization. It is thus possible to carry out an ethylene polymerization by the use of this catalyst at high and low melt flow and still have very similar high productivity as well as a homogeneous, gel free product. This MFR/activity balance renders the catalyst universally applicable for most types of PE resins in all polymerization processes using heterogeneous catalyst systems.

Preferably, the claimed process comprises the subsequent steps of:
a) providing said support comprising a magnesium halide compound having the formula (1),
b) contacting said support comprising a magnesium halide compound having the formula (1) with said alkyl metal halide compound having the formula (2), to give a first product,
c) contacting said first product with said magnesium composition containing magnesium bonded to a hydrocarbyl and magnesium bonded to a hydrocarbyl oxide and having the empirical formula (3), to give a second product, and
d) contacting said second product with said titanium halide compound having the formula (4).

The support used in the process is preferably in the form of particles, the size of which is from about 1 μm to about 1000 μm, preferably about 10 μm to about 100 μm. The support material must have a suitable particle size distribution, a high porosity and a large specific surface area. A good result is achieved if the support material has a specific surface area between 100 and 500 m²/g support and a pore volume of 1–3 ml/g support.

The above catalyst components (2) to (4) are reacted with a suitable catalyst support. If the catalyst components (2) to (4) are in the form of a solution of low viscosity, a good catalyst morphology and therewith a good polymer morphology can be achieved.

It is advantageous if in the magnesium halide compound having the formula (1), R is a $C_1$–$C_{20}$ alkoxy or a $C_7$–$C_{26}$ aralkoxy. However, it is preferable, if said compound (1) is a magnesium dihalide, most preferably $MgCl_2$. For example, the support may comprise solid MgCl2, either alone as a powder, or as a powder mixture with other inorganic powders.

According to another embodiment of the invention, the support comprising a magnesium halide compound having the formula (1) also comprises an inorganic oxide. Several oxides are suitable, but silicon, aluminium, titanium, chromium and zirconium oxide or mixtures thereof are preferred. The most preferred inorganic oxides are silica, alumina, silica-alumina, magnesia and mixtures thereof, uttermost preferably silica. The inorganic oxide can also be chemically pretreated, e.g. by silylation or by treatment with aluminium alkyls.

It is recommendable to dry the inorganic oxide before impregnating it by other catalyst components. A good result is achieved if the oxide is heat-treated at 100° C. to 900° C. for a sufficient time, and thereby the surface hydroxyl groups, in the case of silica, are reduced to below 2 mmol/g $SiO_2$.

According to this aspect of the invention, the support comprises particles having a core comprising said inorganic oxide and a shell comprising said magnesium halide compound having the formula (1). Then, the support comprising a magnesium halide compound having the formula (1) and an inorganic oxide can conveniently be prepared by treating particles of the inorganic oxide with a solution of the magnesium halide and removing the solvent by evaporation.

When using a support containing both said magnesium halide compound (1) and another component, the amount of magnesium halide compound (1) is such that the support contains from 1 to 20% by weight, preferably from 2 to 6% by weight, of magnesium.

The invention further comprises a step of reacting an alkyl metal halide compound of the formula (2):

$$R^1_{n^1}M_{m^1}X^1_{(3m^1-n^1)} \qquad (2)$$

wherein M is B or Al, each same or different $R^1$ is a $C_1$–$C_{10}$ alkyl, each same or different $X^1$ is a halogen, $m^1$ is 1 or 2, $n^1$ is 1 or 2 when $m^1$ is 1 and $n^1$ is an integer from 1 to 5 when $m^1$ is 2. In formula (2), M is preferably Al. Each same or different $R^1$ is preferably a $C_1$–$C_6$ alkyl, and, independently, the preferred same or different halogen $X^1$ is chlorine. $n^1$ is preferably 1 and $m^1$ is preferably the integer 1 or 2. Most preferably, the alkyl metal halide compound having the formula (2) is an alkyl aluminium dichloride, e.g. ethyl aluminium dichloride (EADC).

The alkyl metal halide compound is preferably deposited on the support material. An even deposition is preferably achieved if the viscosity of the halide or its solution is below 10 mPa*s at the temperature applied. To achieve this low viscosity the alkyl metal halide can be diluted by a non-polar hydrocarbon. The best deposition is however achieved if the total volume of the absorbed alkyl metal halide solution is not exceeding the pore volume of the support. A good choice is to use a 5–25% hydrocarbon solution of ethyl aluminium dichloride. The number of additions of the halide is preferably adjusted so that the technique are of not exceeding the pore volume at any additions is not violated, thereby giving an even distribution of the chemical in the surface of the support material.

In the above mentioned preferred order of reaction steps a) to d), step b) can advantageously be performed so that undiluted alkyl metal halide (2) is used to treat the support comprising a magnesium halide compound having the formula (1). Alternatively, the support is contacted with a solution of the alkyl metal halide compound having the formula (2) in an essentially non-polar solvent, preferably a non-polar hydrocarbon solvent, most preferably a $C_4-C_{10}$ hydrocarbon. The concentration of the alkyl metal halide compound having the formula (2) in said non-polar solvent is usually 1–80% by weight, preferably 5–40% by weight, most preferably 10–30% by weight. Advantageously, the support is contacted with a solution of said alkyl metal halide compound (2) in a ratio mol of the alkyl metal halide compound (2) to grams of the support of between about 0.01 mmol/g and about 100 mmol/g, preferably between about 0.5 mmol/g and about 2.0 mmol/g. The amount of reactants can also be expressed as molar ratio, whereby it is advantageous, if the molar ratio of said alkyl metal halide compound (2) to said magnesium halide compound (1) of the support is between about 0.01 mol/mol to about 100, preferably about 0.1 mol/mol to about 10, most preferably from about 0.2 to about 3.0.

In step b), the temperature at said contacting is e.g. 5–80° C., preferably 10–50° C., most preferably 20–40° C. The duration of said contacting is 0.1–3 h, preferably 0.5–1.5 h.

In the claimed process, the magnesium composition containing magnesium bonded to a hydrocarbyl and magnesium bonded to a hydrocarbyl oxide and having the empirical formula (3), each same or different $R^2$ is preferably a $C_2-C_{10}$ alkyl, most preferably a $C_2-C_8$ alkyl. Each same or different $R^3$ is preferably a $C_3-C_{20}$ alkyl, more preferably a branched $C_4-C_{10}$ alkyl, most preferably a 2-ethyl-1-hexyl or a 2-propyl-1-pentyl.

The magnesium composition containing magnesium bonded to a hydrocarbyl and magnesium bonded to a hydrocarbyl oxide having the empirical formula (3) can also be defined by its preparation. According to one embodiment of the invention, it is a contact product of a dialkyl magnesium having the formula (5):

$$R^2{}_2Mg \qquad (5)$$

wherein each same or different $R^2$ is defined as above, and an alcohol. Preferably, the dialkyl magnesium having the formula (5) is dibutyl magnesium, butyl ethyl magnesium or butyl octyl magnesium.

The magnesium composition can thus be defined in that the magnesium composition containing magnesium bonded to a hydrocarbyl and magnesium bonded to a hydrocarbyl oxide having the empirical formula (3) is a contact product of a dialkyl magnesium and an alcohol having the formula (6):

$$R^3OH \qquad (6)$$

wherein each same or different $R^3$ is the same as above. Preferably, the alcohol having the formula (6) is a 2-alkyl alkanol, most preferably 2-ethyl hexanol or 2-propyl pentanol. It has been found that such branched alcohols give better results than linear alcohols.

Preferably, the magnesium composition containing magnesium bonded to a hydrocarbyl and magnesium bonded to a hydrocarbyl oxide having the empirical formula (3) is a contact product of a dialkyl magnesium and an alcohol in a molar ratio alcohol to dialkyl magnesium of 0.01–100 mol/mol, preferably 1.0–5.0 mol/mol, more preferably 1.7–2.0 mol/mol, most preferably 1.8–1.98 mol/mol. The dialkyl magnesium and the alcohol are conveniently contacted by adding the alcohol to a solution of said dialkyl magnesium in an organic solvent, e.g. a $C_4-C_{10}$ hydrocarbon. Then, the concentration of the solution is preferably between 1 and 50% by weight, most preferably between 10 and 30% by weight. The contacting temperature between the dialkyl magnesium and the alcohol is preferably 10–50° C., more preferably from about 20° C. to about 35° C.

In step c) of the above mentioned preferred order a)→d) of the claimed process, the contacting product of the support with the alkyl metal halide compound (2) (=said first product) is contacted with said magnesium composition containing magnesium bonded to a hydrocarbyl and magnesium bonded to a hydrocarbyl oxide and having the empirical formula (3).

Preferably, said first product is contacted with said magnesium composition (3) in a ratio moles of magnesium/g of the support of between 0.001–1000 mmol/g, preferably 0.01–100 mmol/g, most preferably 0.1–10 mmol/g (g of the support means, in the case of said first reaction product, the support which was used as starting material for the first reaction product).

A good deposition of said magnesium composition as a solution is achieved if the volume of the magnesium composition (3) solution is about two times the pore volume of the support material. This is achieved if the concentration of the composition in a hydrocarbon solvent is between 5–60% in respect of the hydrocarbon used. When depositing the magnesium composition on the support material its hydrocarbon solution should have a viscosity that is lower than 10 mPa*s at the temperature applied. The viscosity of the magnesium complex solution can be adjusted for example by the choice of the group $R^4$ in the formula (3), by the choice of the concentration of the hydrocarbon solution, by the choice of the ratio between the magnesium alkyl and the alcohol or by using some viscosity lowering agent. The titanium compound can be added to the support material with or without a previous drying of the catalyst to remove the volatile hydrocarbons. Remaining hydrocarbons can if desired be removed by using slight underpressure, elevated temperature or nitrogen flash.

In the claimed process, the transition metal compound is a titanium halide compound having the formula (4). $R^4$ is preferably a $C_2-C_8$ alkyl, most preferably a $C_2-C_6$ alkyl. $X^2$ is preferably chlorine and, independently, $n^3$ is preferably 0. Said titanium halide compound having the formula (4) is advantageously titanium tetrachloride.

According to one embodiment of the invention, in addition to said titanium compound having the formula (4), a titanium compound having the formula (7):

$$(R^5O)_{n^4}TiX^3{}_{4-n^4} \qquad (7)$$

wherein each same or different $R^5$ is a $C_1-C_{20}$ alkyl, preferably a $C_2-C_8$ alkyl, most preferably a $C_2-C_6$ alkyl, each same or different $X^3$ is a halogen, preferably chlorine, $n^4$ is an integer 1–4, and Ti is quadrivalent titanium, is reacted. The titanium compound (7) always has at least one alkoxy group, which helps dissolving the titanium compound (4) which does not necessarily contain alkoxide, into an organic solvent before the contacting. Naturally, the more alkoxide groups compound (4) has, the less is the need for compound (7). If compound (7) is used, the preferable combination is that of titanium tetrachloride and a titanium tetra $C_1-C_6$-alkoxide.

In step d) of the preferred step sequence a)→d), said second product is advantageously contacted with the titanium compound having the formula (4) in a ratio moles of said titanium compound/g of the support of 0.01–10 mmol/g, preferably 0.1–2 mmol/g. Preferably, said second reaction product is contacted with said titanium compound (4) in a ratio moles of said titanium compound (4)/moles of the magnesium compound (3) of 0.05–2 mol/mol, preferably 0.1–1.2 mol/mol, most preferably 0.2–0.7 mol/mol. The temperature is usually 10–80° C., preferably 30–60° C., most preferably from about 40° C. to about 50° C., and the contacting time is usually 0.5–10 h, preferably 2–8 h, most preferably from about 3.5 h to about 6.5 h.

Above, the process for the preparation of a high activity catalyst component for the production of olefin polymers of different molecular weight and homogeneous consistence, has been described in detail. The invention also relates to such a high activity catalyst component. The suitability for both low and high molecular weight polymerization means, that the claimed catalyst component has high activity both when producing low melt flow rate ethylene polymer and high melt flow rate polymer. High molecular weight polymer has high melt viscosity, i.e. low melt flow rate, and low molecular weight polymer has low melt viscosity, i.e. high melt flow rate.

Simultaneously or separately, it preferably produces ethylene homopolymer and copolymer with low gel content. Most preferably it produces ethylene homopolymer having a Gel number, measured under specified test conditions, of approximatively 0/0 l/m². This means, that by the standards used, the claimed catalyst components can be used to produce totally homogenous (gelless) low and high molecular weight ethylene polymer.

The invention also relates to the use of a catalyst component according to the invention in the polymerization of olefins, preferably in the homo- or copolymerization of ethylene. The advantage of the use is based on the fact that the claimed catalyst is suitable for both low molecular weight and high molecular weight ethylene polymerization and that the ethylene polymer produced is of high quality.

In the polymerization, said alkyl metal halide compound of the formula (2) can, if used, also act completely or partially as a cocatalyst. However, it is preferable to add a cocatalyst having the formula (9):

$$R^6_n{}^5 AlX^4_{3-n}{}^5 \qquad (9)$$

wherein $R^6$ is a $C_1$–$C_{20}$ alkyl, preferably a $C_1$–$C_{10}$ alkyl, most preferably a $C_2$–$C_6$ alkyl such as ethyl, X is a halogen, preferably chlorine, n is 1 to 3, more preferably 2 or 3, most preferably 3, to the polymerization mixture. The cocatalyst having the formula (9) is optional depending on whether said alkyl metal halide compound (2) is acting as cocatalyst or not.

EXPERIMENTAL PART

Some Factors Influencing the Gel Level

Those familiar with the art know that the gel level is influenced by two properties of the polymer, the average molecular weight (for which the melt flow rate, or MFR, is an often used measure) and the broadness of the molecular weight distribution (for which the shear thinning index, or SHI, and the flow rate ratio, or FRR, are often used measures). A high molecular weight (or, a low MFR) usually results in a higher gel level than a low molecular weight (or, a high MFR). Also, a broad molecular weight distribution (or, a high SHI or FRR) usually results in a higher gel level than a narrow molecular weight distribution (or, a low SHI).

Film Blowing

Pelletized material samples were blown to a film on a pilot film line. The film blowing conditions were:
Die diameter 30 mm
Die gap 0.75 mm
Blow-up ratio 3.0

Determination of the Gel Level

A sample of the size 210 mm×297 mm was cut from a film blown on the Collin line. The film sample was put into a gel scanner, which classifies the gels according to their size. The scanner gives the number of gels in three size classes, <0.3 mm, 0.3 . . . 0.7 mm and >0.7 mm. Generally the number of gels in the smallest class can be affected by different random factors, so often only the numbers of the intermediate (0.3 . . . 0.7 mm) and large (>0.7 mm) gels are given.

Determination of the Dispersion of the Black Pellets

The dispersion indicates the homogeneity of the black samples in a similar fashion as the gel level indicates the homogeneity of the film samples. It is measured from the black pellets according to the ISO/DIS 11420 method as follows:

Six pellets are cut using a microtome to 20 μm cuts. Using an optical microscope, the white spots seen in the sample are then measured and classified according to their size. The average number of white spots in each size class is calculated. An ISO value indicating the dispersion is attributed to the material. A high ISO rating denotes a poor homogeneity (large inhomogeneities).

EXAMPLES

Preparation of Complex 1

7.9 g (60.8 mmol) of 2-ethyl-1-hexanol was added slowly to 27.8 (33.2 mmol) of 19.9% butyl-octyl-magnesium. The reaction temperature was kept under 35° C. This complex was used in the following catalyst preparations. 2-ethyl-1-hexanol/butyl-octyl-magnesium ratio is 1.83:2.

Preparation of Complex 2

8.6 g (66.4 mmol) of 2-ethyl-1-hexanol was added slowly to 27.8 (33.2 mmol) of 19.9% butyl-octyl-magnesium. The reaction temperature was kept under 35° C. This complex was used in the following catalyst preparations. 2-ethyl-1-hexanol/butyl-octyl-magnesium ratio is 2:1.

Comparative Example 1

Production of the Film Material

The polymer samples were produced in a continuously operating pilot plant as follows:

The catalyst used in this example was one known in the art, prepared according to patent application EP-A-688794 on a 40 μm silica carrier.

The catalyst was fed into a 50 dm³ loop prepolymerization reactor, where a small amount of polymer was formed on the catalyst particles. The slurry containing the prepolymer was taken out of the reactor and passed into a 500 dm³ loop reactor. There the reactor conditions were set so that ethylene homopolymer with MFR$_2$=500 was formed at a rate of about 25 kg/h. The polymer slurry was taken out of the loop reactor into a flash unit, where the hydrocarbons were separated from the polymer.

The polymer was then passed into a gas phase reactor where the polymerization was continued at a rate of about 35 kg/h. The reactor conditions were set so that MFR$_{21}$ of the polymer collected from the reactor was about 9 and the density about 946 kg/m$^3$.

The powder was then collected and blended with additives after which it was pelletized. A film was then blown from a pellet sample and the gel level was determined as described above. Table 1 shows some data of the material.

Comparative Example 2 (Catalyst APS 12 μm)

6.0 g (1.6 mmol/g carrier) of 20% EADC was added to 5.9 g of Sylopol 2212 silica carrier. The mixture was stirred for one hour at 30° C. 8.9 g (1.4 mmol/g carrier) of complex prepared according to Complex Preparation 1 was added after which the mixture was stirred for 4 hours at 35–45° C. 0.76 g (0.7 mmol/g carrier) of TiCl$_4$ was added and the mixture was stirred for 5 hours at 45° C. The catalyst was dried at 45–80° C. for 3 hours.

Composition of the catalyst was: Al 2.4%, Mg 2.0%, Ti 2.0%, Cl 12.5%.

The polymer was prepared as in Comparative example 1.

Comparative Example 3

Production of the Pipe Material

The material was produced according to Comparative Example 1, except that a catalyst was prepared on a 20 μm silica carrier. Also, the material targets were changed to some extend. In the first stage, material having MFR$_2$=300 was produced at a rate of 32 kg/h. The gas phase reactor was operated so that the production was 39 kg/h, MFR$_{21}$ of the final material was 9 and density was 948. The polymer was then blended with additives including an additive containing carbon black to give the material a black colour. The material was then pelletized. The dispersion was then determined from the black pellets according to the procedure described earlier. Table 1 shows some data of the material.

Example 1

Catalyst APS 11 μm 3.7 g (1.0 mmol/g carrier) of 20% EADC was added to 5.9 g of Sylopol 5510 silica/MgCl$_2$ carrier and the mixture was stirred for one hour at 30° C. 5.7 g (0.9 mmol/g carrier) of complex prepared according to Complex Preparation 1 was added and the mixture was stirred for 4 hours at 35–45° C. 0.6 g (0.55 mmol/g carrier) of TiCl$_4$ was added and the mixture was stirred for 5 hours at 45° C. The catalyst was dried at 45–80° C. for 3 hours.

Composition of the catalyst was: Al 1.8%, Mg 3.9%, Ti 2.1%, Cl 18.5%.

The polymerization was performed as in Comparative example 1.

Example 2

Production of the Film Material

The catalyst was prepared according to Example 1, with the exception that a carrier having 29 μm average particle size was used. The bimodal polyethylene material was produced according to Comparative Example 1. Table 1 shows process and evaluation data.

Example 3

Production of the Pipe Material

The catalyst was prepared according to Example 1, with the exception that a carrier having 20 μm average particle size was used. The bimodal polyethylene material was produced according to Comparative Example 3. Table 1 shows process and evaluation data.

Polymerization Results

The catalysts have been tested in bimodal Loop-Gas-phase process under fixed split and loop melt index.

TABLE 1

Polymerization and Analysis Results Obtained with Different Catalysts

|  | CE1 | CE2 | CE3 | Ex 1 | Ex 2 | Ex 3 |
|---|---|---|---|---|---|---|
| Productivity in loop | 1.8 | 5.0 |  | 5.0 | 3.8 |  |
| Loop MFR$_2$ | 520 | 514 | 300 | 650 | 430 | 323 |
| Final MFR$_{21}$ | 9.7 | 6.6 | 9.5 | 6.3 | 6.1 | 9.2 |
| Final density | 945.5 | 946.5 | 949[1] | 945.5 | 946.2 | 949[1] |
| SHI$_{5/300}$ | 87.5 | 61.0 | 40.4[2] | 90.2 | 111 | 56.6[2] |
| Gels (0.3…0.7/>0.7) | 50/0 | 300/0 |  | 0/0 | 0/0 |  |
| Dispersion <30/30…60/60…80/>80 μm |  |  | 14/2/0.3/0.8 |  |  | 17/2/0/0.2 |
| ISO rating |  |  | 5.5 |  |  | 3.0 |

[1]Base resin density, not including carbon black
[2]SHI$_{2.7/210}$

Flow rate ratio (FRR) has been calculated as the ratio of two MFR values measured using different loads, FRR$_{21/5}$= MFR$_{21}$/MFR$_5$.

The number of gels was calculated from film blown to film with pilot line. Comparative results to pilot film line were also obtained from the film analysis with large scale film lines.

The representative polymer lots were characterized by rheology, where SHI$_{5/300}$ comparison is made to polymer with same molecular weight.

Measurements were made on Rheometrics RDA II at 190° C. Complex viscosity (η*) together with storage modulus (G') and loss modulus (G") as a function of frequency (ω) or complex modulus (G*) were obtained.

Complex viscosity (η*) as a function of complex modulus (G*) corresponds to viscosity as a function of shear stress and its shape is independent of MW. SHI calculated from this function can be used as a measure of MWD.

$$SHI_{5/300}=\eta_{5\ kPa}/\eta_{300\ kPa},$$

where η$_{5\ kPa}$ and η$_{300\ kPa}$ are η* at a constant G* of 5 kPa and 300 kPa, respectively.

What is claimed is:

1. A process for the preparation of a catalyst component for the production of olefin polymers, which comprises reacting:

a support comprising a magnesium halide compound having the formula (1):

(RO)$_{2-n}$MgX$_n$         (1)

wherein R is a $C_1$–$C_{20}$ alkyl or a $C_7$–$C_{26}$ aralkyl, each the same or different, X is a halogen, and n is an integer 1 or 2 which further comprises an inorganic oxide;

a compound having the formula (2):

$$R^1{}_{n^1}M_{m^1}X^1{}_{(3m^1-n^1)} \quad (2)$$

wherein M is B or Al, each same or different $R^1$ is a $C_1$–$C_{10}$ alkyl, each same or different $X^1$ is a halogen, $m^1$ is 1 or 2, $n^1$ is 1 or 2 when $m^1$ is 1 and $n^1$ is an integer from 1 to 5 when $m^1$ is 2;

a magnesium composition containing magnesium bonded to a hydrocarbyl and magnesium bonded to a hydrocarbyl oxide, said magnesium composition having the empirical formula (3):

$$R^2{}_{n^2}(R^3O)_{2-n^2}Mg \quad (3)$$

wherein each same or different $R^2$ is a $C_1$–$C_{20}$ alkyl, each same or different $R^3$ is a $C_1$–$C_{20}$ alkyl, $n^2$ is between 0.01 and 1.99, which is the contact product of a dialkyl Magnesium and an alcohol in a molar ratio of alcohol to dialkyl magnesium of 1.8–1.98 mol/mol, and;

a titanium halide compound having the formula (4):

$$(R^4O)_{n^3}TiX^2{}_{4-n^3} \quad (4)$$

wherein each same or different $R^4$ is a $C_1$–$C_{20}$ alkyl, each same or different $X^2$ is a halogen, and $n^3$ is 0 or an integer 1–3.

2. A process according to claim 1, wherein
a) said support comprising a magnesium halide compound having the formula (1) is contacted with said compound having the formula (2), to give a first reaction product;
b) said first reaction product is then contacted with said magnesium composition containing magnesium bonded to a hydrocarbyl and magnesium bonded to a hydrocarbyl oxide and having the empirical formula (3), to give a second reaction product, and
c) said second reaction product is contacted with said titanium halide compound having the formula (4).

3. The process according to claim 1, wherein said support is in the form of particles, the size of which is from about 1 μm to about 1000 μm.

4. The process according to claim 1, wherein said magnesium halide compound having the formula (1) is a magnesium dihalide.

5. The process according to claim 2, wherein said second reaction product is contacted with said titanium compound having the formula (4) in a ratio moles of said titanium compound/g of the support of 0.01–10 mmol/g of the support.

6. The process according to claim 1, wherein said support comprising a magnesium halide compound having the formula (1) also comprises an inorganic oxide.

7. The process according to claim 1, wherein said support comprises particles having a core comprising said inorganic oxide and a shell comprising said magnesium halide compound.

8. The process according to claim 1, wherein in said support, the amount of said magnesium halide compound having the formula (1), expressed as percent magnesium Mg calculated based on the total weight of the support, is 1–20%.

9. The process according to claim 1, wherein in said compound having the formula (2), M is Al, each same or different $R^1$ is a $C_1$–$C_6$ alkyl, each $X^1$ is a chlorine, $n^1$ is 1, and $m^1$ is an integer 1 or 2.

10. The process according to claim 9, wherein said compound having the formula (2) is an alkyl aluminum dichloride.

11. The process according to claim 2, wherein in step b), said support comprising a magnesium halide compound having the formula (1) is contacted with a solution of said compound having the formula (2) in an essentially non-polar solvent.

12. The process according to claim 11, wherein the concentration of said compound having thee formula (2) in said non-polar solvent is 1–80% by weight.

13. The process according to claim 11, wherein the total volume of the compound (2) solution, is not exceeding the pore volume of the support.

14. The process according to claim 2, wherein in step (b), said support comprising a magnesium halide compound having the formula (1) is contacted with a solution of said compound having the formula (2) in a ratio moles of said compound having the formula (2) to grams of said support of between about 0.01 mmol/g and about 100 mmol/g.

15. The process according to claim 2, wherein in step (b), said support comprising a magnesium halide compound having the formula (1) is contacted with a solution of said compound having the formula (2) in a molar ratio of said compound having the formula (2) to said magnesium halide compound of formula (1) of between about 0.01 and about 100 mol/mol.

16. The process according to claim 1, wherein in said magnesium composition containing magnesium bonded to a hydrocarbyl and magnesium bonded to a hydrocarbyl oxide having the empirical formula (3), each same or different $R^2$ is a $C_2$–$C_{10}$ alkyl.

17. The process according to claim 1, wherein in said magnesium composition containing magnesium bonded to a hydrocarbyl and magnesium bonded to a hydrocarbyl oxide having the empirical formula (3) each same or different $R^3$ is a $C_3$–$C_{20}$ alkyl.

18. The process according to claim 1, wherein said magnesium composition containing magnesium bonded to a hydrocarbyl and magnesium bonded to a hydrocarbyl oxide having the empirical formula (3) is a contact product of dialkyl magnesium having the formula (5):

$$R^2{}_2Mg \quad (5)$$

wherein each same or different $R^2$ is defined as in claim 1, and an alcohol.

19. The process according to claim 18, wherein said dialkyl magnesium having the formula (5) is dibutyl magnesium, butyl ethyl magnesium or butyl octyl magnesium.

20. The process according to claim 1, wherein said magnesium composition containing magnesium bonded to a hydrocarbyl and magnesium bonded to a hydrocarbyl oxide having the empirical formula (3) is a contact product of a dialkyl magnesium and an alcohol having the formula (6):

$$R^3OH \quad (6)$$

wherein each same or different $R^3$ is the same as in claim 1.

21. The process according to claim 20, wherein said alcohol having the formula (6) is a 2-alkyl substituted n-alcohol.

22. The process according to claim 2, wherein said second reaction product is contacted with said titanium compound having the formula (4) in a ratio moles of said titanium compound/total moles of the magnesium of 0.05–2 mol/mol.

23. A catalyst component for the production of olefin polymers, characterized in that it has been prepared by a process according to claim 1.

24. The process according to claim 2, wherein in step (c), said first reaction product, is contacted with said magnesium composition containing magnesium bonded to a hydrocarbyl and magnesium bonded to a hydrocarbyl oxide and having the empirical formula (3) in a ratio moles of magnesium/g of the support between 0.001–1000 mmol/g of the support wherein g of the support means, the support which was used as starting material for the first reaction product.

25. The process according to claim 2, wherein in step (c), said first product is contacted with a solution of said magnesium composition (3) in a hydrocarbon.

26. The process according to claim 25, wherein the concentration of said solution is 5–60% by weight.

27. The process according to claim 25, wherein the volume of said solution is about two times the pore volume of the support or said first product.

28. The process according to claim 1, wherein in said titanium halide compound having the formula (4), $R^4$ is a $C_2$–$C_8$ alkyl.

29. The process according to claim 1, wherein in said titanium halide compound having the formula (4), $X^2$ is chlorine.

30. The process according to claim 1, wherein in said titanium halide compound having the formula (4), $n^3$ is 0.

31. The process according to claim 1, wherein said titanium halide compound having the formula (4) is titanium tetrachloride.

32. The process according to claim 1, wherein a titanium compound having the formula (7):

$$(R^5O)_{n^4}TiX^3_{4-n^4} \qquad (7)$$

wherein each same or different $R^5$ is a $C_1$–$C_{20}$ alkyl, each same or different $X^3$ is a halogen, $n^4$ is an integer 1–4, is reacted with said titanium compound having the formula (4).

33. The process according to claim 32, wherein the titanium compound according to formula (4) is titanium tetrachloride and the titanium;compound having the formula (7) is titanium tetra $C_1$–$C_6$-alkoxide.

* * * * *